United States Patent [19]
Akiyama et al.

[11] Patent Number: 4,991,118
[45] Date of Patent: Feb. 5, 1991

[54] ENHANCED DATA STREAM PROCESSING IN A FIXED FUNCTION TERMINAL

[75] Inventors: Alex A. Akiyama, Tokyo, Japan; Leah J. H. Busboom, Oronoco; William J. Maitland, Jr., Rochester, both of Minn.

[73] Assignee: International Business Machines Corp., Armonk, N.Y.

[21] Appl. No.: 338,997

[22] Filed: Apr. 17, 1989

[51] Int. Cl.[5] .......... G06K 1/00
[52] U.S. Cl. .......... 364/521; 364/514; 364/200; 364/900
[58] Field of Search .... 364/510, 521, 514, 242.94 MS File, 364/242.95 MS File, 242.96 MS File, 242.5 MS File, 919 MS File, 919.5 MS File, 940.61 MS File; 358/462

[56] References Cited

U.S. PATENT DOCUMENTS

| | | | |
|---|---|---|---|
| 4,587,633 | 5/1986 | Wang et al. | 364/900 |
| 4,937,784 | 6/1990 | Masai et al. | 364/900 |

*Primary Examiner*—Arthur G. Evans
*Attorney, Agent, or Firm*—Hugh D. Jaeger

[57] ABSTRACT

An enhanced fixed function video display terminal having various features for the efficient transmission of data streams. The video display terminal may have a memory for storing substantially more characters than can be displayed to the operator on the display screen width and length. This permits manipulation of data at document page boundaries, scrolling, etc. One or more extended attribute buffers are added to enable characters to be displayed in a variety of fonts, colors, etc. The data stream from the host computer to the display terminal and from the display terminal to the host computer contains data characters and attribute characters which are interleaved for efficiency in input/output programming. When receiving data, the display terminal has the capability of parsing the data stream into data or attribute characters and adding pad characters to completely fill the display buffers. Similarly, the display terminal interleaves data and attribute characters and compacts the data stream by stripping pad characters when sending data back to the host computer.

17 Claims, 9 Drawing Sheets

ENHANCED DATA STREAM PROCESSING IN A FIXED FUNCTION TERMINAL

TECHNICAL FIELD

The subject invention relates generally to video display terminals for data processing systems, and more particularly, relates to fixed function video display terminals having enhanced communication features.

BACKGROUND ART

The use of video display terminals is now common in data processing. Each such display terminal normally has at least a video monitor or liquid crystal display (LCD) and an operator keyboard. In addition, terminals may also contain other audio and/or visual output devices (e.g., alarms, etc.) and other manual input devices (e.g., joysticks, etc.).

Architecturally, display terminals may be divided into two categories. The more complex type may be termed multifunction or "smart" terminals. Such terminals have sufficient logic capability within the terminal to reconfigure and adapt to various different applications and to respond directly to various operator inputs. The advantage of this architecture is that the communication requirements between terminal and host computer are greatly reduced. Unfortunately, the additional logic in this type of terminal makes it more costly to build and maintain.

The second category of display terminal is the fixed function or "dumb" terminal. This type operates in a fashion where each keystroke or operator input is transmitted to and processed within the host computer. Since the display terminal has a minimum of logic, the cost is less than a smart terminal. Previous terminals of this type had a very limited command set with which the display controller software in the host computer could update the contents of the screen (e.g., basic moves, inserts, write between limits, read between limit commands, etc.). In addition, most previous fixed function terminals had a screen buffer the same size as the physical screen. This limits the display controller software to manipulating data only on the physical screen (usually 24 rows by 80 columns).

Fixed function display terminals tend to require more communication time because all the data is processed in the host computer. The communication requirement imposes a burden on the host computer and the terminal which it would be desirable to avoid.

One method known in the art for greatly enhancing the fixed function terminal is the addition of an attribute buffer. The attribute buffer is arranged within the display terminal such that each displayable character has one or more corresponding attribute(s) which may be specified by the attribute buffer. Specifiable attributes include color, blinking, underlining, etc.

To enhance performance and reduce complexity, fixed function terminals have display buffers which are addressed as one large sequential space. This means that data sent to the display buffer must be sequential and contiguous for each write operation. This is also true for receiving data from a fixed function terminal (i.e., read operation). As display buffers get larger (i.e., more characters are displayed) and more attributes are added, the performance of the fixed function terminal becomes limited by the time required to make the I/O transfers to and from this single large sequential space. Therefore, it becomes important to maximize the efficiency of such I/O transfers.

*IBM Technical Disclosure Bulletin*, Volume 24, Number 11A, dated April, 1982, entitled "Prefetch of Attribute Bytes in a Display Buffer", by G. A. Emerson, suggests that efficiency may be enhanced by coding field attributes and extended field attributes for easy detection. This permits intermixing characters within a single I/O transfer.

A further enhancement is proposed in *IBM Technical Disclosure Bulletin*, Volume 26, Number 103, dated March, 1984, entitled "CRT Display Feature Editing and Control", by D. A. Stockwell. This reference proposes alternating display and attribute characters within the I/O stream. This simplifies input/output operations by permitting a single write or read to access both the display buffer and extended attribute buffers of a terminal. The disadvantage of this approach is the requirement to transfer all characters within each I/O operation, even though many (in some cases, perhaps even most) character positions are blank.

Another attempted improvement is described in *IBM Technical Disclosure Bulletin*, Volume 26, Number 10A, dated March, 1984, entitled "Implementation of Field Inheritance", by P. A. Beaver, et al. This approach to the problem of blank characters is insertion of pad characters into the data stream. The problem with this technique is that these additional pad characters consume I/O time when inserted into the data stream.

All of these techniques provide less than optimal performance because of the transmission of excess blank characters and/or the reliance upon multiple I/O operations.

This problem is particularly acute in a word processing environment, although not limited to such an environment where the right end of line invariably ends in a number of spaces. These spaces are virtually meaningless, but must nevertheless be individually transmitted in prior art systems.

DISCLOSURE OF THE INVENTION

The present invention is particularly useful in a fixed function display terminal having an internal display buffer and extended attribute buffers with character capacity in excess of the character capacity of the visual display, although it is not limited to excess capacity displays. This permits manipulation of data not currently on the screen. This is desirable to provide functions not bounded by a physical screen boundary. The performance of various functions (e.g., scrolling) is greatly facilitated.

Having thus enhanced the performance using large capacity display and extended attribute buffers, performance is further enhanced by distinguishing between presentation space data and attribute data where only changes in attribute are provided within the data stream. Similarly, end of row characters are passed with the data stream in order to facilitate compacting the data sent over the physical connection. In order to accomplish this, data parsing and padding functions are added to the device.

One aspect is to have the device automatically pad a row so the full width of the display buffer need not be written to for each row in the display buffer, thereby obviating the need to transmit blanks or other pad characters. The device recognizes a special end of row character within the data stream to the device. The control character indicates to the device to:

1. pad the remainder of the current row with a predefined character; and,
2. write the next data character in the data stream at the first position of the next row in the display buffer.

All subsequent characters in the data stream are written to the next row until the next end of row character is found, which again causes the device to pad and write to the next row, and so forth. The end of row character is identified as a unique code point that does not conflict with any data characters that can be written to the device.

In addition, the reverse operation (read operation) causes the device to read only the necessary data from each row and not include the specified pad character in the data returned from a row. Both presentation space and attribute pad characters are recognized and not returned in the data stream. The end of row character is included in the data by the device so that variable length rows can be distinguished.

The start and end columns of the I/O operation may also be specified to further enhance performance of column operations. In this way, column data can be written or read without requiring unnecessary data or requiring multiple I/O operations to be performed in order to write the data to the desired locations in the display buffer. In addition, when the device supports an extended attribute buffer (EAB), both a presentation space (character plane) pad character and an EAB pad character can be specified. The PS and EAB will both be automatically padded with the specified pad character.

A further aspect of the present invention is the capability of enhancing the fixed function device with EAB to automatically parse data between presentation space data and EAB data. The EAB data can be provided intermixed with PS (presentation space) data, but need not be at every character position. In other words, only changes in the attribute need to be provided within the data stream. A special attribute control character in the data stream denotes that the next character in the data stream is an attribute and should be written to the EAB. If multiple EABs are supported, an EAB number designating a particular EAB follows the attribute control. In this manner, only changes in the EAB need to be provided, rather than providing EAB characters for every PS character position. The device automatically parses the data stream to determine where the character is written (EAB or PS). For the reverse operation, a read, the device indicates an EAB character by including the attribute control character and EAB number, if necessary, in the returned data stream.

By having the fixed function device parse the data stream and pad the display buffer, the number of bytes of data that need to be sent to the device is significantly reduced, resulting in better performance.

It is an object of the present invention to provide a fixed function display terminal having enhanced data stream processing features.

It is another object of the present invention to provide an input/output protocol having intermixed display and attribute characters.

It is a further object of the present invention to provide an input/output protocol providing for automatic row padding and the parsing of display and attribute characters.

DESCRIPTION OF THE INVENTION

The present invention is a fixed function display terminal having various features particularly adapted, but not limited to word processing applications. These features are described herein in detail with lesser attention directed to those aspects of the display terminal which are well known in the art.

Figure 1:
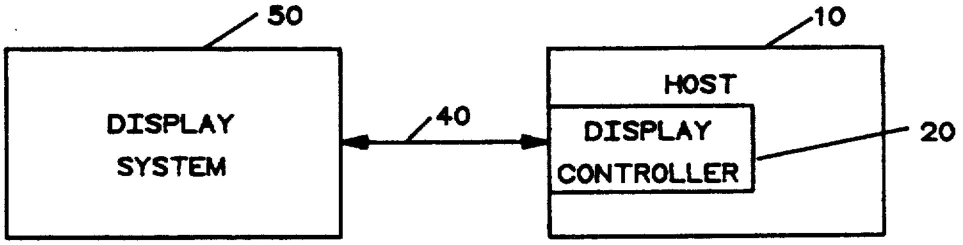
FIG. 1 is a block diagram of a display subsystem of the present invention coupled to a host computer.

FIG. 1 is a block diagram showing display subsystem 50, the present invention, coupled to host computer 10. The connection is made via standard input/output interface 40. Display subsystem 50 is a fixed function terminal. That means that every operator input is directly communicated to host computer 10 via standard input/output interface 40. Control of display subsystem 50 is exercised by display controller 20, which has a physical connection to display subsystem 50.

Figure 2:
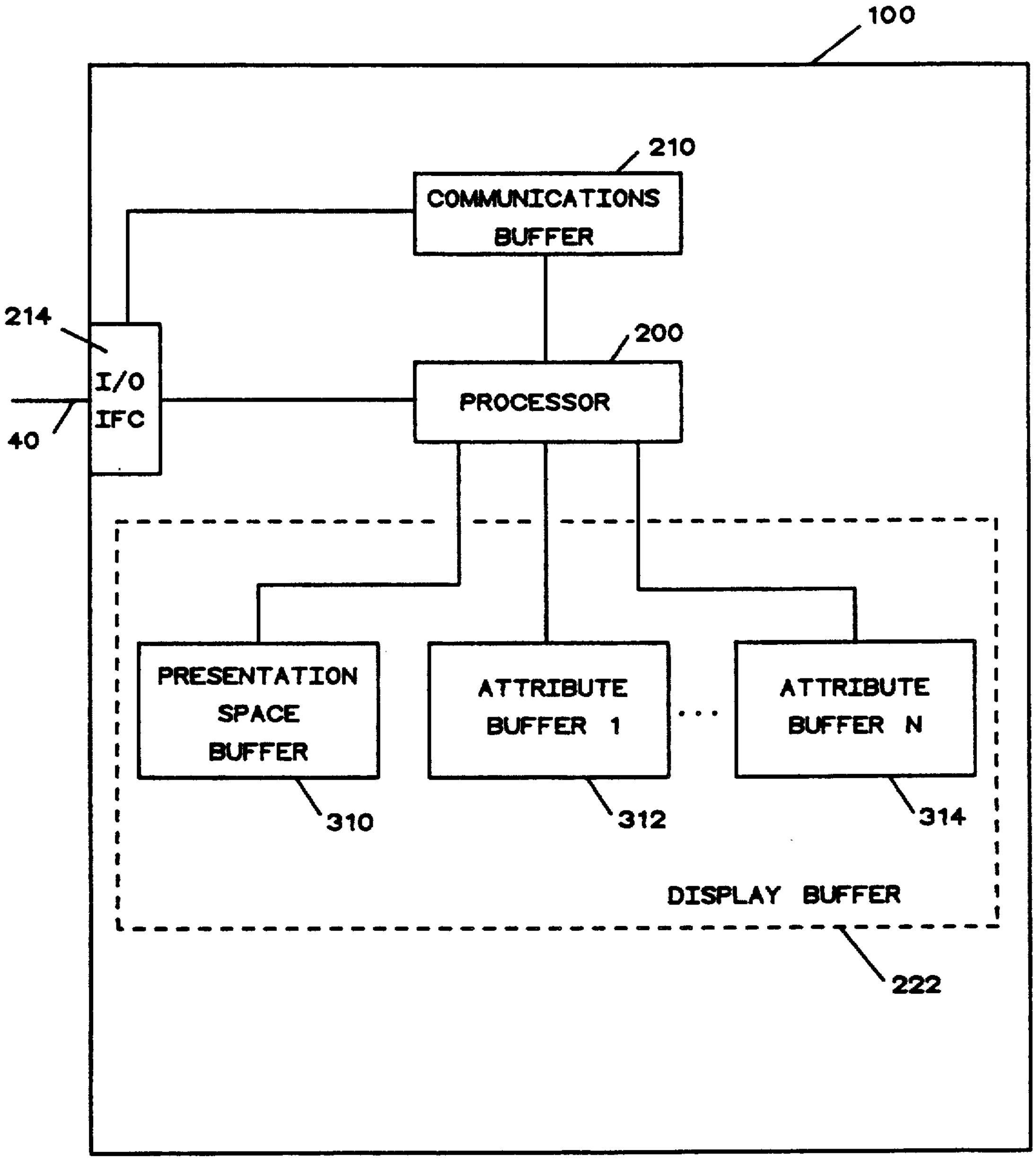
FIG. 2 is a block diagram of control 100 of the present invention.

FIG. 2 is a block diagram of control 100 of display subsystem 50. It contains a number of elements, of which are omitted from this view for clarity. Control 100 is a microprocessor based terminal controller which is coupled via input/output interface 40 to display controller 20 (see also FIG. 1).

The elements of control 100, which are most pertinent to the present invention, include I/O interface logic 214 which is coupled via input/output interface 40 to the host system. Processor 200 is a microprogrammed controller which controls operation of display subsystem 50. Presentation space buffer 310 stores the characters to be actually displayed. Attribute buffers 312 . . . 314 store attribute characters.

Figure 3:
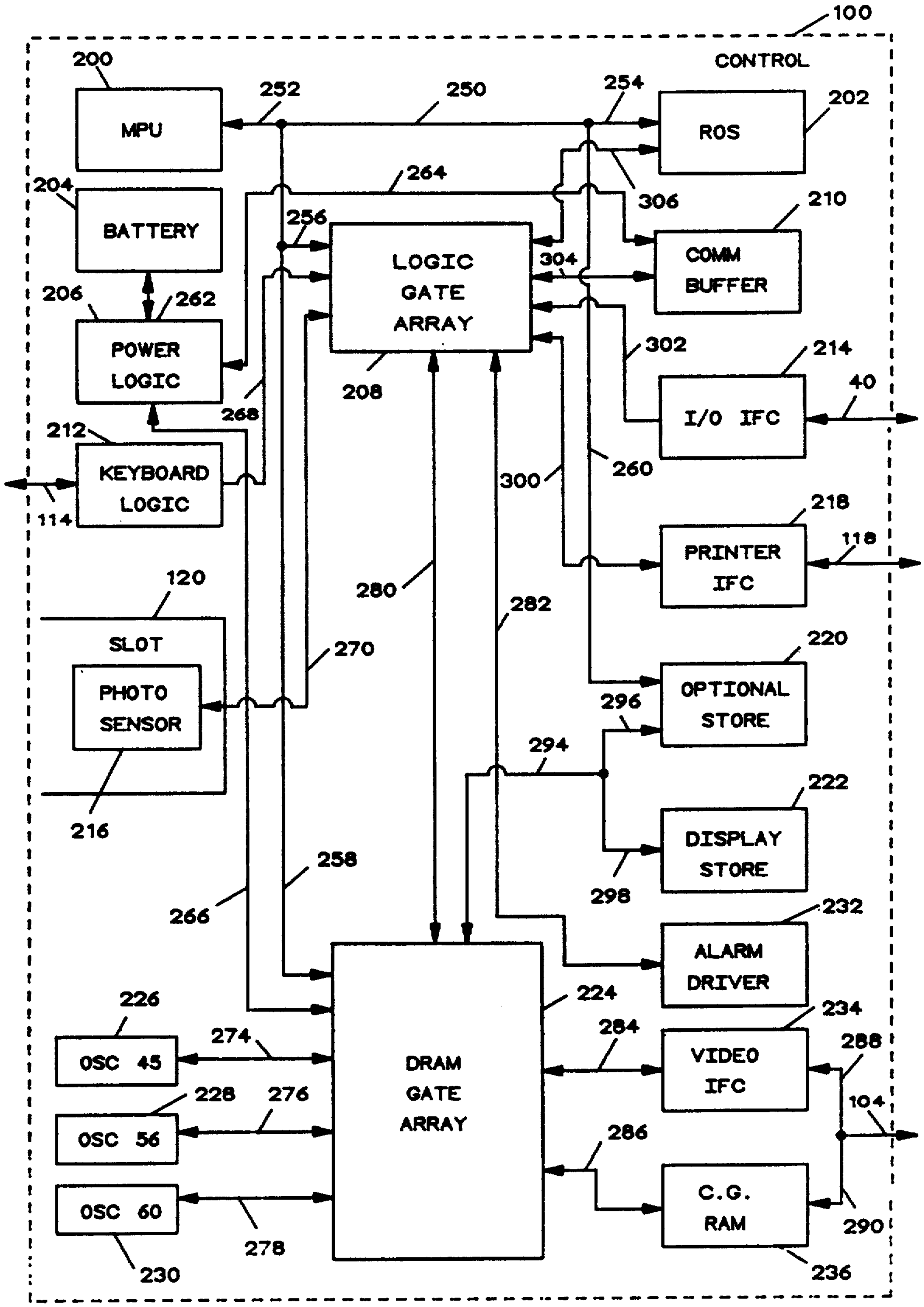
FIG. 3 is a detailed block diagram of the control section.

FIG. 3 is a more detailed block diagram of control 100. A microprocessor unit, MPU 200, manages control 100. MPU 200 executes microprogram instructions stored within read only store, ROS 202. Table 1 is a list of the microprograms stored within ROS 202.

Micro instructions, data, and control signals are transferred between MPU 200 and the other elements of control 50 via data bus 250. Stub 252 couples data bus 250 to MPU 200.

TABLE 1

| Name | Function |
|---|---|
| Link Display | Basic communication between I/O interface and display buffer |
| Display Background | Display buffer to display regeneration buffer |
| Keyboard | Scan and input keyboard data |
| Link Printer | I/O interface to COMM buffer management |
| System Print Background | Communication buffer to |

TABLE 1-continued

| Name | Function |
|---|---|
| | parallel bus management |
| Local Print Background parallel | Regeneration buffer to bus management |
| Record Mode | Input mode management |
| Play Mode | Output mode management |
| Off-line Setup Mode | Initialization |
| On-line Setup Mode | Initialization |
| Basic Assurance Test | On-line subsystem test |
| Off-line Test | Off-line subsystem test |

Stub 254 couples data bus 250 to ROS 202. Similarly, stub 258 couples bus 250 to DRAM gate array 224 and to logic gate array 208 via stub 256. Stub 260 couples data bus 250 to optional store 220.

Battery 204 supplies power to maintain critical volatile memory in case of power failure. Power from battery 204 is coupled to power logic 206 via cable 262. Power logic 206 senses loss of power and switches power from battery 204 to vital circuitry via cables 264 and 266.

Keyboard interface circuit (IFC) 212 couples to a keyboard via cable 114 and contains the necessary drivers, receivers, and timing circuits. Keyboard IFC 212 is coupled to logic gate array 208 via cable 268 by which operator keyboard inputs may be transferred to host computer 10 in accordance with the further description below.

Slot 120 contains photo sensor 216 whereby it may be determined that a security key has been properly inserted into slot 120. Photo sensor 216 communicates with the rest of control 50 via cable 270 to logic gate array 208.

DRAM gate array 224 provides the addressing and control for the major random access, read/write storage elements of control 100. Timing is provided by 45 megahertz oscillator, OSC45 226, 56 megahertz oscillator, OSC56 228, and 60 megahertz oscillator, OSC60 230. These are coupled to DRAM gate array 224 via cables 274, 276 and 278, respectively. DRAM gate array 224 is controlled via cable 280 from logic gate array 208.

One of the storage elements controlled by DRAM gate array 224 is character generation (CG) random access memory (RAM) 236. This device is coupled to DRAM gate array 224 via cable 286 and stores the data required to generate characters to refresh the display of monitor 106. Video interface circuit (IFC) 234 contains the drive circuitry. It is coupled to DRAM gate array 224 via cable 284. Video subsystem 102 is driven by cable 104 from stubs 290 and 288 coupled to CG RAM 236 and video IFC 234, respectively. Alarm driver 232 is coupled via cable 282 to logic gate array 208.

Display store 222 is coupled to DRAM gate array 224 via cable 29 and stub 298. Display store 222 contains the memory which stores the characters to be displayed and the attributes thereof. The organization of display store 222 is explained in detail below.

Optional store 220 is an expansion card which contains both read only storage and random access memory. These are used to add to the least significant bits of the microprogram storage and the display data. Printer interface circuit (IFC) 218 is coupled to logic gate array 208 via cable 300. It contains the drivers, receivers, and timing circuitry for controlling a printer via cable 118.

Communication between control 100 and host computer 10 is via standard input/output interface 40. This I/O interface terminates at I/O IFC 214, which contains the drivers, receivers, and timing circuitry required to operate on a standard I/O interface. I/O IFC 214 is coupled via cable 302 to logic gate array 208. The data transferred via standard interface 40 is buffered in COMM buffer 210 which is coupled to logic gate array 208 via cable 304. The data is stored in COMM buffer 210 in character serial fashion as the transfer is made on standard interface 40. The parsing and compacting operations are discussed in detail below.

Figure 4:
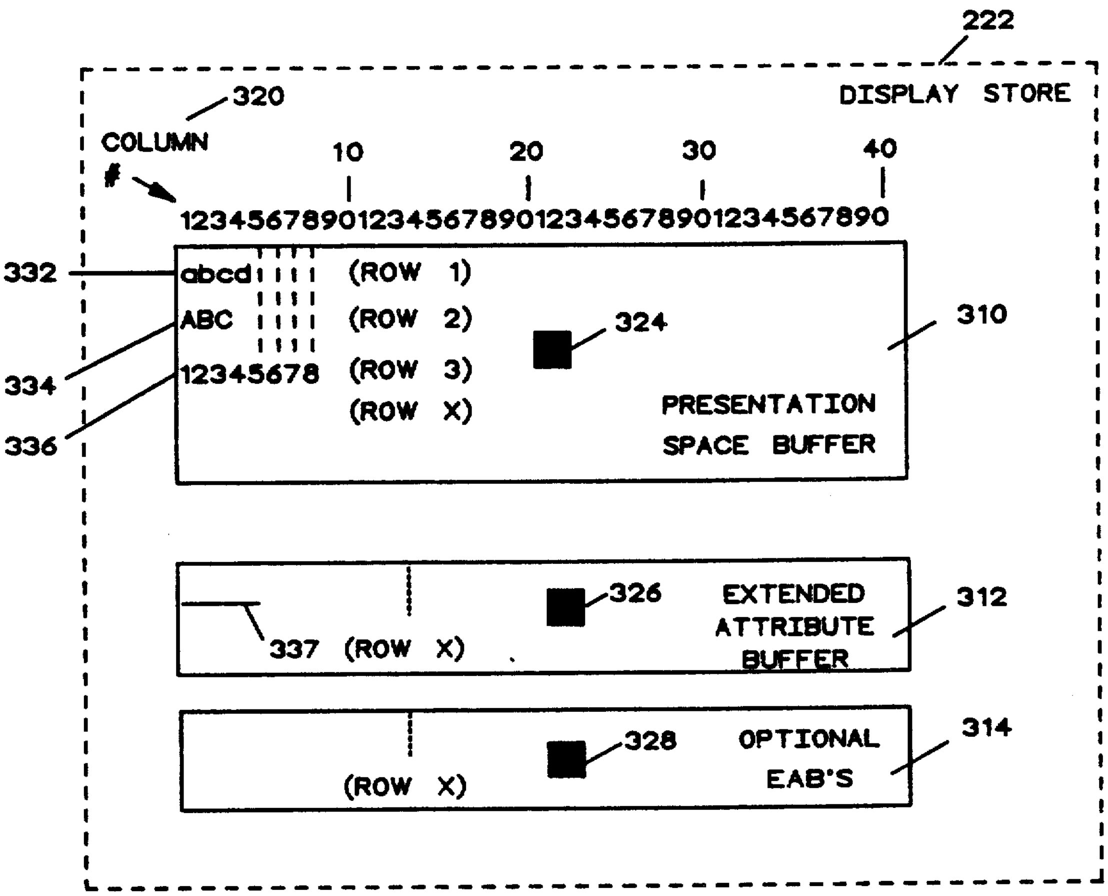
FIG. 4 is a representation of display store.

FIG. 4 is a conceptual diagram of the layout of display store 222. It is essentially one large contiguous random access memory. However, it can be thought of as two or more separate storage elements divided in address space. Display store 222 is conceptually one character in width. Presentation space buffer 310 is one of the address spaces. It contains the characters which are actually displayed on monitor 106. The capacity of presentation space buffer 310 may be, but is not required to be substantially larger than that required to store that data displayed on monitor 106. As explained above, this permits enhanced performance for various functions such as scrolling, etc. Extended attribute buffer 312 is of the same size as presentation space buffer 310. Extended attribute buffer 312 stores characters which signify various attributes of the characters stored in presentation space buffer 310. Other buffers of the same size, optional EABs 314, may be employed to specify other attributes of the characters stored in display store 222.

Presentation space buffer 310 can be thought of as containing a number of columns. Preferably at least 80 columns are present even though only 40 are shown in FIG. 4 for the purposes of clarity. Along the other axis, presentation space buffer 310 has a number of rows. In the preferred mode, monitor 106 can display up to 24 rows. Therefore, presentation space buffer 310 may have well in excess of 24 rows. As actually implemented, presentation space buffer 310 is consecutively addressed. That means that the hardware address of the first column of row N is one greater than the address of the last column of row $N-1$.

Each character stored in presentation space buffer 310 can be referenced by a column number 320 (from 1-80 in preferred embodiment) and a row number. Character 324, for example, can be referenced as column 22, row X.

Extended attribute buffer 312 can be thought of as similarly organized. Character 326 is located at column 22, row X. Therefore, it is directly related to character 324. In fact character 326 specifies one or more attributes of character 324. Other attributes of character 324 may be specified by character 328 which is located at column 22, row X, of optional EABs 314.

Characters abcd 332, ABC 334, and 12345678 336 are shown in presentation space buffer 310 illustrating the manner in which they would be displayed on monitor 106. Underlining attribute "_" 337 is shown in extended attribute buffer 312 illustrating the manner in which it would be displayed on monitor 106.

Figure 5:
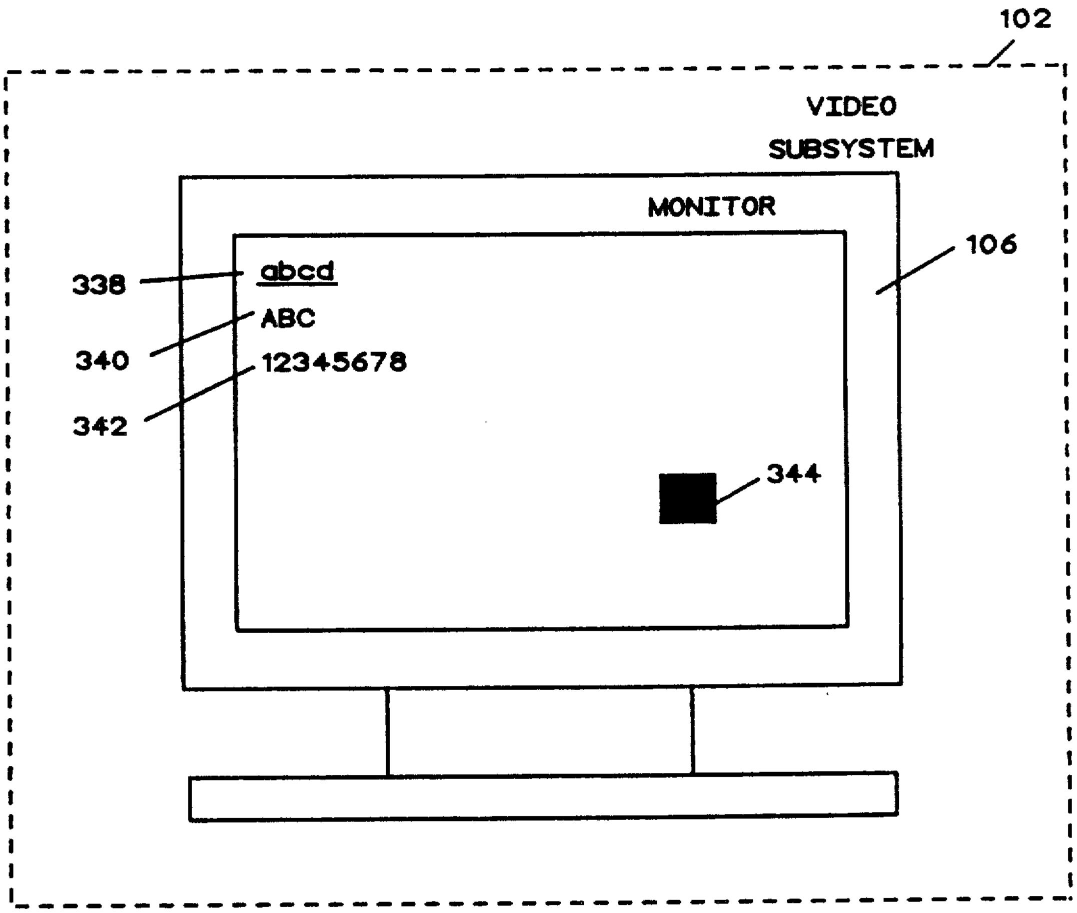
FIG. 5 shows display of characters on video subsystem.

FIG. 5 shows the contents of presentation space buffer 310 as it would be displayed on monitor 106 of video subsystem 102. The organization of monitor 106 is the same as the organization of presentation space buffer 310. That means that character 344 as displayed would be the same as character 324 as displayed with the attributes signified by characters 326 and 328. Similarly, abcd 338, ABC 340, and 12345678 342 are displayed as stored in presentation space buffer 310 combined with underlining attribute "_" 337 stored in extended attribute buffer 312 (see also FIG. 4).

Figure 6:
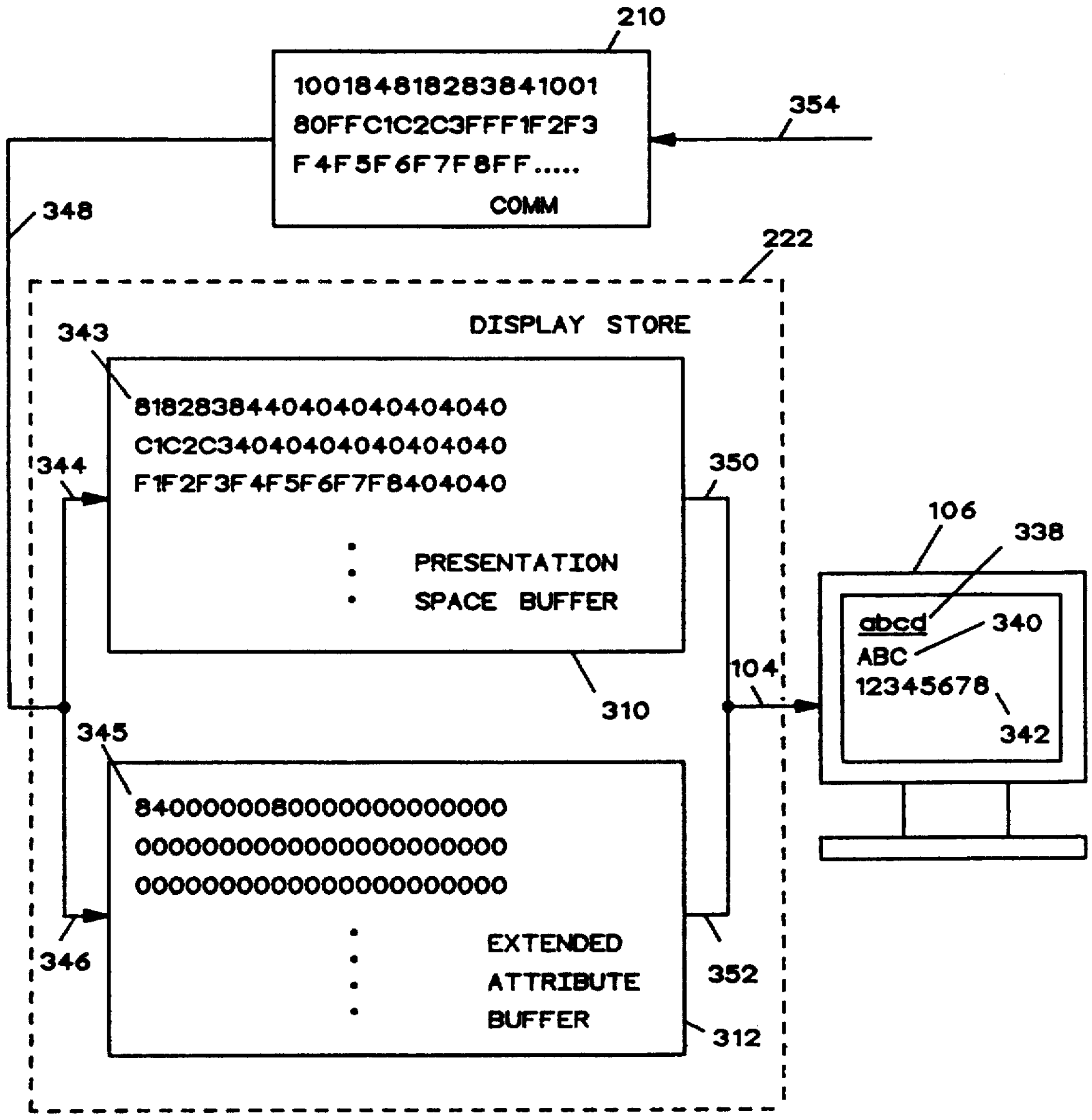
FIG. 6 is a diagram showing data handling for a write operation.

FIG. 6 is a flow diagram showing the parsing of an I/O data stream received from host computer 10 into its various components along with the padding of characters into unused addresses of display store 222. For simplicity, various hardware elements are not shown to add greater clarity to the functional relationships. For greater detail concerning the hardware configuration, reference should be made to FIG. 3.

A character serial data stream is received from host computer 10 and transferred to COMM buffer 210 via data path 354. As shown in FIG. 3, data path 354 contains cable 304 coupled between COMM buffer 210 and logic gate array 208, cable 302 coupled between logic gate array 208 and I/O IFC 214, and standard I/O interface 40.

Referring again to FIG. 6, COMM buffer 210 temporarily stores each character in serial fashion in the order in which it was received from the host computer 10. Communication buffer 210 is functionally coupled to display store 222 via data path 348 which is divided into stubs 344 and 346 and coupled to presentation space buffer 310 and extended attribute buffer 312, respectively. The data is sent from COMM buffer 210 to display store 222 via data path 348 in character serial fashion in the order in which it was received from host computer 10 in FIFO (i.e., first in-first out) fashion. The data stream is parsed in the manner described below such that characters to be displayed are transferred in serial fashion to presentation space buffer 310 via stub 344 and attribute characters are transferred to extended attribute buffer 312 via stub 346. For simplicity, only one extended attribute buffer is shown although additional such buffers may be used as discussed above and as explained below. After being parsed, each character is written into the appropriate buffer in the order received. The first character is written at column 1, row 1 or such other starting position as specified in the data stream. The next character is written to the same row at the next column to the right unless the next character is an attribute character which exists at the same column location as the presentation space character. This process continues until the each desired column has been written in a given row. The next character is then written into the left-most column of the next sequential row. Unused addresses are filled with pad characters in the manner explained below. Pointer 343 in presentation space buffer 310 and pointer 345 in EAB buffer 312 each point to the same address within its respective buffer. This ensures that each EAB character corresponds to the appropriate presentation space character.

Data from display store 222 is transmitted to monitor 106 via cable 104 from the combination of data paths 350 and 352. The characters stored in presentation space buffer 310 are written as modified by the corresponding characters of extended attribute buffer 312 at the corresponding positions on monitor 106 in the manner specified above.

Figure 7:
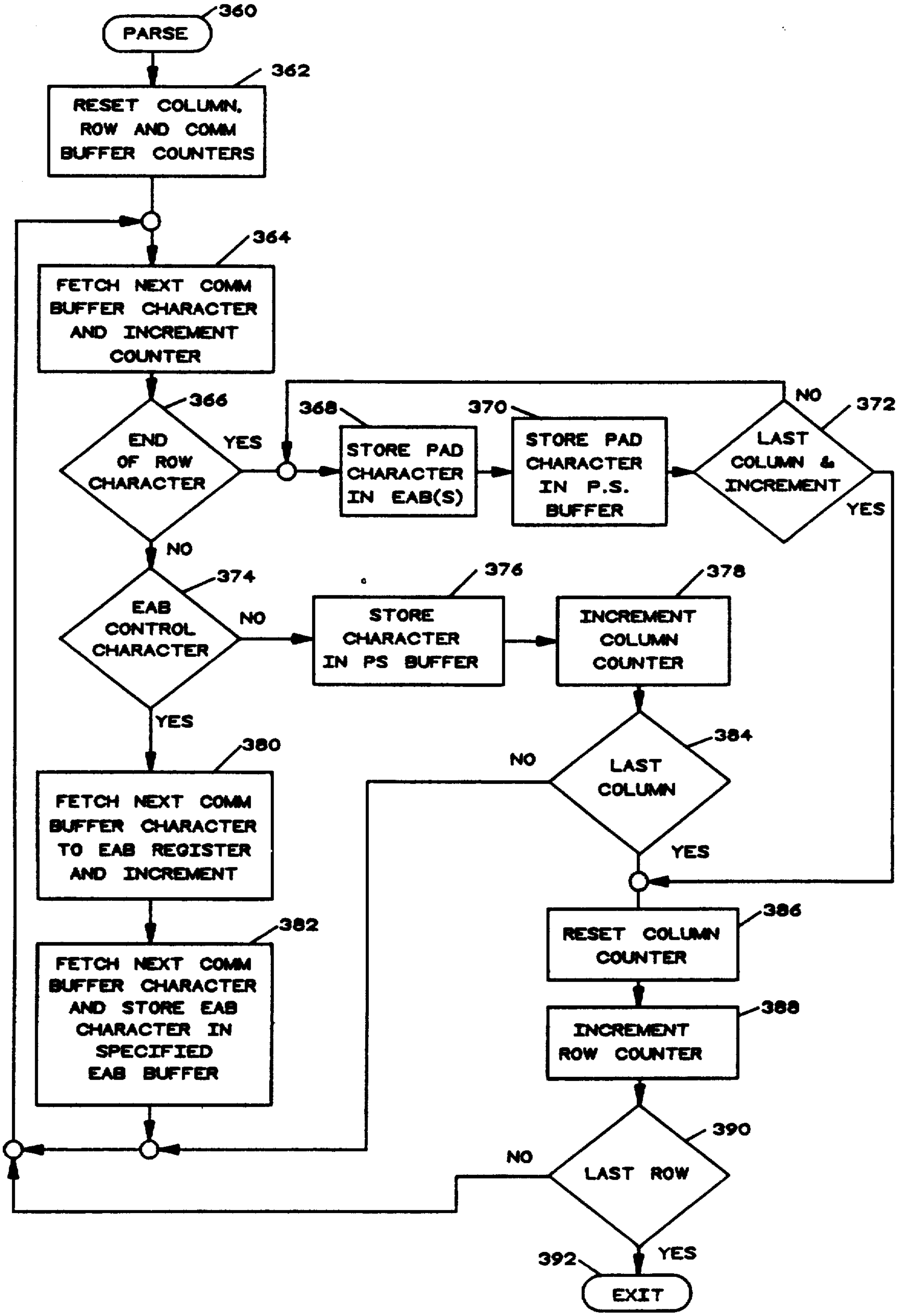
FIG. 7 is a flowchart for the parse operation.

FIG. 7 is a flowchart of the parsing operation which corresponds to the data handling shown in FIG. 6. The procedure is entered at element 360. Element 362 initializes the procedure by resetting the counters for column, row and the COMM buffer. The first two of these will control the storing of characters within the presentation space buffer and the extended attribute buffers, wherein each column is filled sequentially within a given row followed by each column within the next sequential row. The COMM buffer counter controls removal of characters from COMM buffer which characters are stored in the order received from host computer 10.

Element 364 fetches the next character from COMM buffer 210 as controlled by COMM buffer counter which is then incremented in preparation for the next fetch. The character fetched is then reviewed to determine whether it is an end of row character. This is a unique character which indicates that no more valid characters will be received for the current row. This is represented as hexadecimal "FF" (see also FIG. 6).

If the pad control character is found at element 366, elements 368 and 370 store presentation space and attribute pad characters at the current column position in the EABs and presentation space buffer, respectively. These are represented as hexadecimal "00" for EAB 312 and hexadecimal "40" for presentation space buffer 310 in the preferred embodiment, although any unique code can be selected for the pad character (see also FIG. 6). Element 372 determines whether all columns have been padded for the current row by examining the column counter. If the row is not yet complete, the column counter is incremented and control returned to element 368. When the last column has been padded, control is directed to element 386 to begin the next row.

If element 366 has not found an end of row character, element 374 determines whether the instant character is an EAB control character. Again referring to FIG. 6, this is represented by a hexadecimal "10" If an EAB control character is found, element 380 fetches the next character from COMM buffer 210 and increments the COMM buffer counter. That character will designate which EAB to reference in multiple EAB systems. Therefore, the character is sent to the EAB reference register. Element 382 then fetches the EAB character to be stored and increments the COMM buffer counter. After the EAB character has been stored in the appropriate EAB, control is returned to element 364 to fetch the next character from COMM buffer 210.

Should element 374 not find an EAB control character, the current character is assumed to be a data character to be stored in presentation space buffer 310 for display on monitor 106. Element 376 effects the store operation. Element 378 then increments the column counter. Element 384 determines whether all columns of the current row have been filled. If not, control is returned to element 364 to fetch the next character from COMM buffer 210. If element 384 determines that the row has been filled, element 386 resets the column counter so that the left-most desired column of the next row will be accessed. Element 388 increments the row counter to access the next row. Element 390 determines whether all rows have been filled. If not, control is returned to element 364 to begin the next row. If all rows are filled, the procedure exits at element 392.

Figure 8:
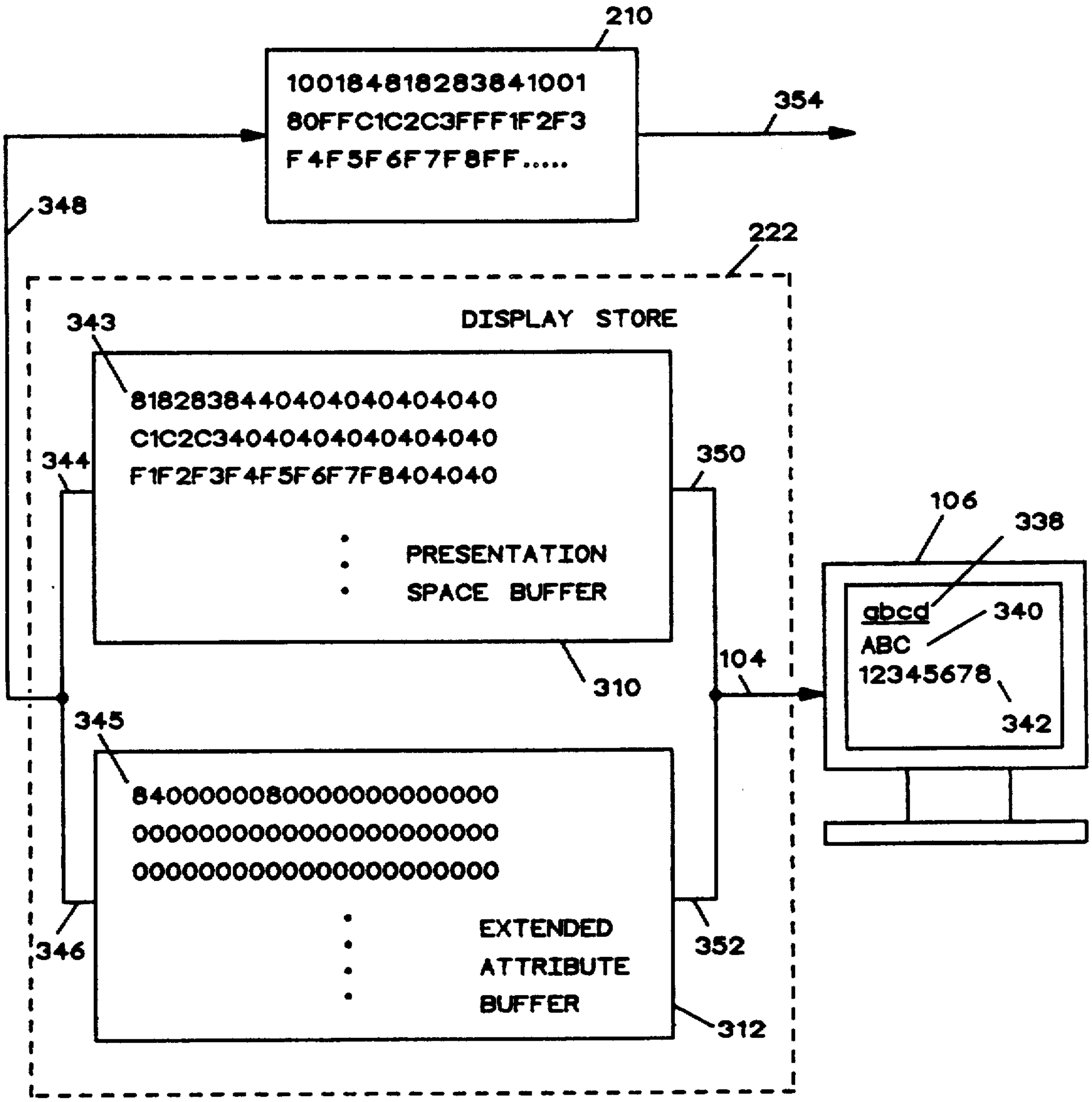
FIG. 8 shows data handling for a read operation.

FIG. 8 is a schematic representation of the compaction of data as it is being sent from display store 222 to host computer 10. The components are the same as in FIG. 6 with the data being sent in the opposite direction.

Figure 9A:
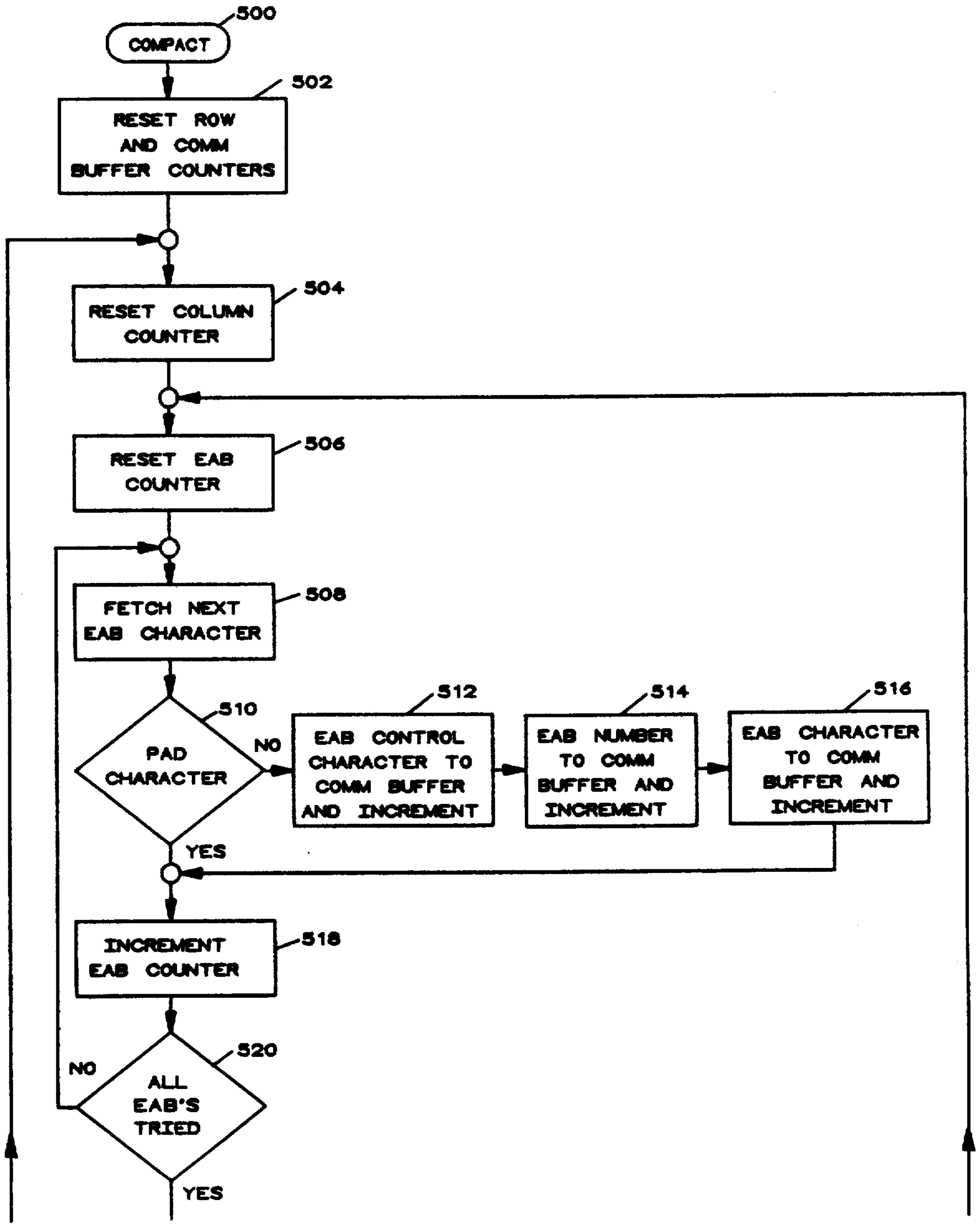
FIG. 9 is a flowchart for the data compaction operation.
Figure 9B:
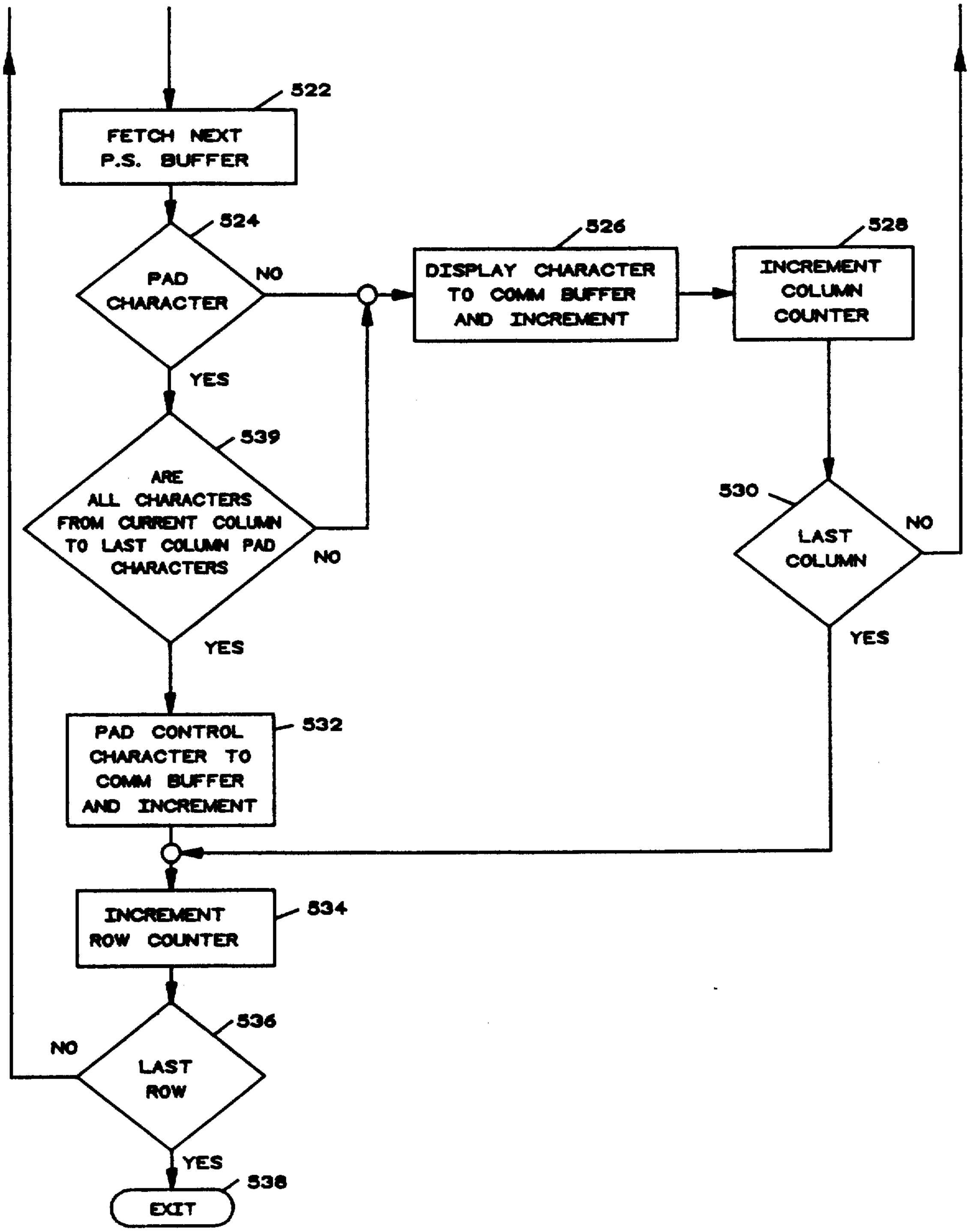

FIG. 9 is a flowchart for the compaction of data as shown in FIG. 8. The procedure is entered via element 500. The row and COMM buffer counters are reset at element 502. Element 504 resets the column counter, and element 506 resets the EAB counter. All four of these counters perform the same function as was described above in accordance with FIG. 7.

The next character is fetched from the first EAB at element 508. Element 510 determines whether the character is an attribute pad character. If not, then the character fetched is a valid EAB character. Element 512 stores an EAB control character (i.e. hexadecimal "10") in COMM buffer 210 and increments the COMM buffer counter. The EAB number is the value of the EAB counter which is next stored in COMM buffer 210 and the COMM buffer counter is again incremented. The actual EAB character is transferred to COMM buffer 210 by element 516, and COMM buffer counter is incremented. Control is then returned to element 518.

Incrementing the EAB counter at element 518 permits access of the next EAB in multiple EAB systems. Element 520 determines whether all of the EABs have been tried for the current column number. If not, control is given to element 508 to fetch a character from the next EAB.

After each EAB has been tried for a given column, element 522 fetches the next character from presentation space buffer 310. Element 524 determines whether it is a presentation space pad character. If not, element 526 stores the valid character in COMM buffer 210 and COMM buffer counter is incremented. Element 528 increments the column counter. If element 530 determines that this is not the last column, control is returned to element 506 to begin the next column with the first EAB. If all columns are tried, control is given to element 534 to find the next row.

If element 524 finds a presentation space pad character, element 539 determines whether all the presentation space positions from the current column to the last column are filled with pad characters. If not, the character is a valid data character and the process flows to element 526. If element 539 finds that all the presentation space positions are filled with pad characters, no further valid data is in the current row and control is given to element 532. Element 532 stores a row ending control character (i.e., hexadecimal "FF") in COMM buffer 210 and increments the COMM buffer counter.

The row counter is incremented at element 534 which enables access to the next row. Element 536 determines if all rows have been tried. If not, control is returned to element 504. If all rows have been accessed, the procedure exits at element 538.

Having thus described the preferred embodiment, those skilled in the art will be able to readily apply the teachings found herein to other systems without departing from the scope of the claims.

We claim:

1. An enhanced fixed function display, comprising:
   a. means for receiving a data stream from a workstation controller;
   b. means for parsing said data stream into a presentation space portion and a first attribute portion, wherein said first attribute portion further comprises only changed attributes;
   c. means for placing said presentation space portion into a presentation space buffer; and,
   d. means for placing said first attribute portion into a first attribute buffer.

2. The display of claim 1 further comprising:
   a. means for detecting an end of row character in said data stream;
   b. means for padding said presentation space buffer with a presentation space pad character upon the detection of said end of row character; and,
   c. means for padding said first attribute buffer with a first attribute pad character upon the detection of said end of row character.

3. An enhanced fixed function display, comprising:
   a. means for receiving a data stream from a workstation controller;
   b. means for parsing said data stream into a presentation space portion, a first attribute portion, and a second attribute portion wherein said first and second attribute portions further comprise only changed attributes;
   c. means for placing said presentation space portion into a presentation space buffer;
   d. means for placing said first attribute portion into a first attribute buffer; and,
   e. means for placing said second attribute portion into a second attribute buffer.

4. A display of claim 3, further comprising:
   a. means for detecting an end of row character in said data stream;
   b. means for padding said presentation space buffer with a presentation space pad character upon the detection of said end of row character;
   c. means for padding said first attribute buffer with a first attribute pad character upon the detection of said end of row character; and,
   d. means for padding said second attribute buffer with a second attribute pad character upon the detection of said end of row character.

5. A method of parsing a data stream having a presentation space portion and a first attribute portion, comprising the steps of:
   a. receiving a data stream from a workstation controller;
   b. pointing a pointer to a current character in said data stream;
   c. reading the current character to determine whether it is a presentation space character or an attribute character;
   d. placing said current character in a presentation space buffer if it is a presentation space character; and,
   e. writing said current character in a first attribute buffer if it is an attribute character.

6. A method of claim 5, further comprising the steps of:
   a. padding said presentation space buffer with a presentation space pad character upon the detection of said end of row character; and,
   b. padding said first attribute buffer with a first attribute pad character upon the detection of said end of row character.

7. A method of building a data stream from a presentation space buffer and a first attribute buffer in a display, comprising the steps of:
   a. pointing a pointer to the current character position;
   b. reading the current character position in said first attribute buffer;
   c. if an attribute character is present at said current character position in said first attribute buffer, generating an attribute control character and placing said attribute control character and said attribute character in said data stream;
   d. reading a presentation space character at the current character position in said presentation space buffer; and,
   e. placing said presentation space character in said data stream.

8. The method of claim 7, further comprising the step of placing an end of row character in said data stream if said presentation space character is a presentation space pad character, if all the subsequent presentation space characters until the end of the row of said presentation space buffer are all presentation space pad characters, if said attribute character is an attribute pad character, and if all the subsequent attribute pad characters until the end of the row of said attribute buffer are all attribute pad characters.

9. A method of building a data stream from a presentation space buffer, a first attribute buffer, and a second attribute buffer in a display, comprising the steps of:

a. pointing a pointer to the current character position;

b. reading the current character position in said first attribute buffer;

c. if a second attribute character is present at said current character position in said second attribute buffer, generating said attribute control character and a second attribute buffer number, and said second attribute character in said data stream;

d. reading a presentation space character at the current character position in said presentation space buffer; and, e. placing said presentation space character in said data stream.

10. The method of claim 9, further comprising the steps of:

a. placing an end of row character in said data stream if said presentation space character is a presentation space pad character, if all the subsequent presentation space characters until the end of the row of said presentation space buffer are all presentation space pad characters, if said first attribute character is an attribute pad character, if all the subsequent attribute characters until the end of the row of said first attribute buffer are all attribute pad characters, if said second attribute character is an attribute pad character, and if all the subsequent attribute characters until the end of the row of said second attribute buffer are all attribute pad characters.

11. A method of parsing a data stream having a presentation space portion, a first attribute portion, and a second attribute portion, comprising the steps of:

a. receiving a data stream from a workstation controller;

b. pointing a pointer to a current character in said data stream;

c. reading the current character to determine whether it is a presentation space character, a first attribute character, or a second attribute character;

d. placing said current character in a presentation space buffer if it is a presentation space character;

e. placing said current character in a first attribute buffer if it is a first attribute; and, f. placing said current character in a second attribute buffer if it is a second attribute character.

12. The method of claim 11, further comprising the steps of:

a. determining if said current character is an end of row character;

b. padding said presentation space buffer with a presentation space pad character upon the detection of said end of row character;

c. padding said first attribute buffer with a first attribute pad character upon the detection of said end of row character; and, d. padding said second attribute buffer with a second attribute pad character upon the detection of said end of row character.

13. A display subsystem comprising:

a. a monitor for displaying a number of symbols;

b. a keyboard; and, c. a controller responsively coupled to said monitor and said keyboard wherein said controller has means for coupling said controller to a host computer and wherein said controller has memory means for storing a plurality of characters and means responsively coupled to said memory means and said coupling means for compacting pad characters stored in said memory means before transmission via said coupling means to said host computer.

14. A fixed function display subsystem according to claim 13 wherein said controller further comprises means responsively coupled to said memory means and said coupling means for padding pad characters into said memory means pursuant to indication by transmission via said coupling means from said host computer.

15. A fixed function display subsystem according to claim 13 wherein said memory means further comprises:

a. a character memory for storing more than said number of symbols; and, b. at least one attribute memory for storing at least one attribute for each of said more than said number of symbols.

16. A fixed function display subsystem according to claim 15 wherein said controller further comprises means responsively coupled to said coupling means, said character memory, and said at least one attribute memory for parsing data received by said coupling means from said host computer into characters for storage in said character memory and attributes for storing in said at least one attribute memory.

17. A fixed function display subsystem according to claim 15 wherein said controller further comprises means responsively coupled to said coupling means, said character memory, and said at least one attribute memory for compacting data stored in said character memory and in said at least one attribute memory without pad characters into a single data stream for transmission to said host computer via said coupling means.

* * * * *